(12) United States Patent
Abe et al.

(10) Patent No.: US 11,042,334 B2
(45) Date of Patent: Jun. 22, 2021

(54) INFORMATION PROCESSING APPARATUS, IMAGE FORMING APPARATUS, AND NON-TRANSITORY COMPUTER READABLE MEDIUM

(71) Applicant: FUJI XEROX CO., LTD., Tokyo (JP)

(72) Inventors: Kazuhiko Abe, Kanagawa (JP); Fumiyoshi Kawase, Kanagawa (JP); Takashi Sakamoto, Kanagawa (JP); Masaharu Shimojima, Kanagawa (JP); Tsukasa Tsushima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 181 days.

(21) Appl. No.: 15/989,244

(22) Filed: May 25, 2018

(65) Prior Publication Data

US 2018/0357020 A1    Dec. 13, 2018

(30) Foreign Application Priority Data

Jun. 9, 2017  (JP) .............................. JP2017-114022

(51) Int. Cl.
*G06F 3/12* (2006.01)

(52) U.S. Cl.
CPC ............ *G06F 3/1208* (2013.01); *G06F 3/121* (2013.01); *G06F 3/1236* (2013.01); *G06F 3/1259* (2013.01); *G06F 3/1273* (2013.01); *G06F 3/1285* (2013.01)

(58) Field of Classification Search
CPC ............................... G06F 3/1208; G06F 3/121
See application file for complete search history.

(56) References Cited

U.S. PATENT DOCUMENTS

| | | | | |
|---|---|---|---|---|
| 2005/0276619 A1* | 12/2005 | Taguchi | ............. | G03G 15/0121 399/27 |
| 2008/0055640 A1* | 3/2008 | Takahashi | ............. | G06F 3/1204 358/1.15 |
| 2008/0158590 A1* | 7/2008 | Lim | ...................... | G06K 15/00 358/1.15 |
| 2012/0166751 A1* | 6/2012 | Matsumoto | ........... | G06F 3/0665 711/170 |
| 2014/0347692 A1* | 11/2014 | Iida | ......................... | H04N 1/21 358/1.15 |
| 2015/0154484 A1* | 6/2015 | Iwasaki | ................. | G06F 3/1222 358/1.14 |

(Continued)

FOREIGN PATENT DOCUMENTS

JP    2004-246880 A    9/2004
JP    2007-156581 A    6/2007

(Continued)

OTHER PUBLICATIONS

Apr. 27, 2021 Office Action issued in Japanese Patent Application No. 2017-114022.

*Primary Examiner* — Ibrahim Siddo
(74) *Attorney, Agent, or Firm* — Oliff PLC

(57) ABSTRACT

An information processing apparatus includes a collecting unit that, when a predetermined transmission condition is established after a start of an operation of the information processing apparatus, collects information related to an operational environment of the information processing apparatus, and a transmitting unit that transmits the collected information to an image forming apparatus connected to the information processing apparatus via a network.

6 Claims, 10 Drawing Sheets

(56) References Cited

U.S. PATENT DOCUMENTS

2015/0222507 A1* 8/2015 Choy .................. H04L 43/0811
                                                                    370/252
2015/0371126 A1* 12/2015 Ota ...................... G06K 15/408
                                                                   358/1.14

FOREIGN PATENT DOCUMENTS

| JP | 2009-151678 A | 7/2009 |
| JP | 2015-7964 A | 1/2015 |
| WO | 2007/063779 A1 | 6/2007 |

* cited by examiner

FIG. 11

| | | | |
|---|---|---|---|
| 711 — TIME AND DATE | yyyy/mm/dd/hh/mm/ss | yyyy/mm/dd/hh/mm/ss | yyyy/mm/dd/hh/mm/ss |
| 712 — HOST NAME | ********* | ********* | ********* |
| 713 — USER ID | ********* | ********* | ********* |
| 714 — USER NAME | ********* | ********* | ********* |
| 715 — OS | ********* | ********* | ********* |
| 716 — DRIVER VERSION | 1.0.1 | 1.0.2 | 1.0.2 |
| 717 — PORT SETTING | ********* | ********* | ********* |
| 718 — IP ADDRESS | ********* | ********* | ********* |
| 719 — MAC ADDRESS | ********* | ********* | ********* |
| 720 — FILE NAME | ********* | ********* | ********* |
| 721 — PROCESS RESULTS | NOT OK | OK | OK |
| 722 — PAGE COUNT | ********* | ********* | ********* |
| 723 — PRINT SETTING | ********* | ********* | |
| ... | | | |

700

INFORMATION PROCESSING APPARATUS, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from, Japanese Patent Application No. 2017-114022 filed Jun. 9, 2017.

BACKGROUND

(i) Technical Field

The present invention relates to an information processing apparatus, an image forming apparatus, and a non-transitory computer readable medium.

(ii) Related Art

Driver software programs (hereinafter referred simply to as drivers) prepared respectively for peripheral apparatuses are installed, on a computer to control the peripheral apparatuses.

SUMMARY

According to an aspect of the invention, there is provided an information processing apparatus. The information processing apparatus includes a collecting unit that, when a predetermined transmission condition is established after a start of an operation of the information processing apparatus, collects information related to an operational environment of the information processing apparatus, and a transmitting unit that transmits the collected information to an image forming apparatus connected to the information processing apparatus via a network.

BRIEF DESCRIPTION OF THE DRAWINGS

Exemplary embodiments of the present invention will be described in detail based on the following figures, wherein:

FIG. 11 illustrates a display screen example of search results.

DETAILED DESCRIPTION

Exemplary embodiment is described below with reference to the drawings.

First Embodiment

Figure 1:
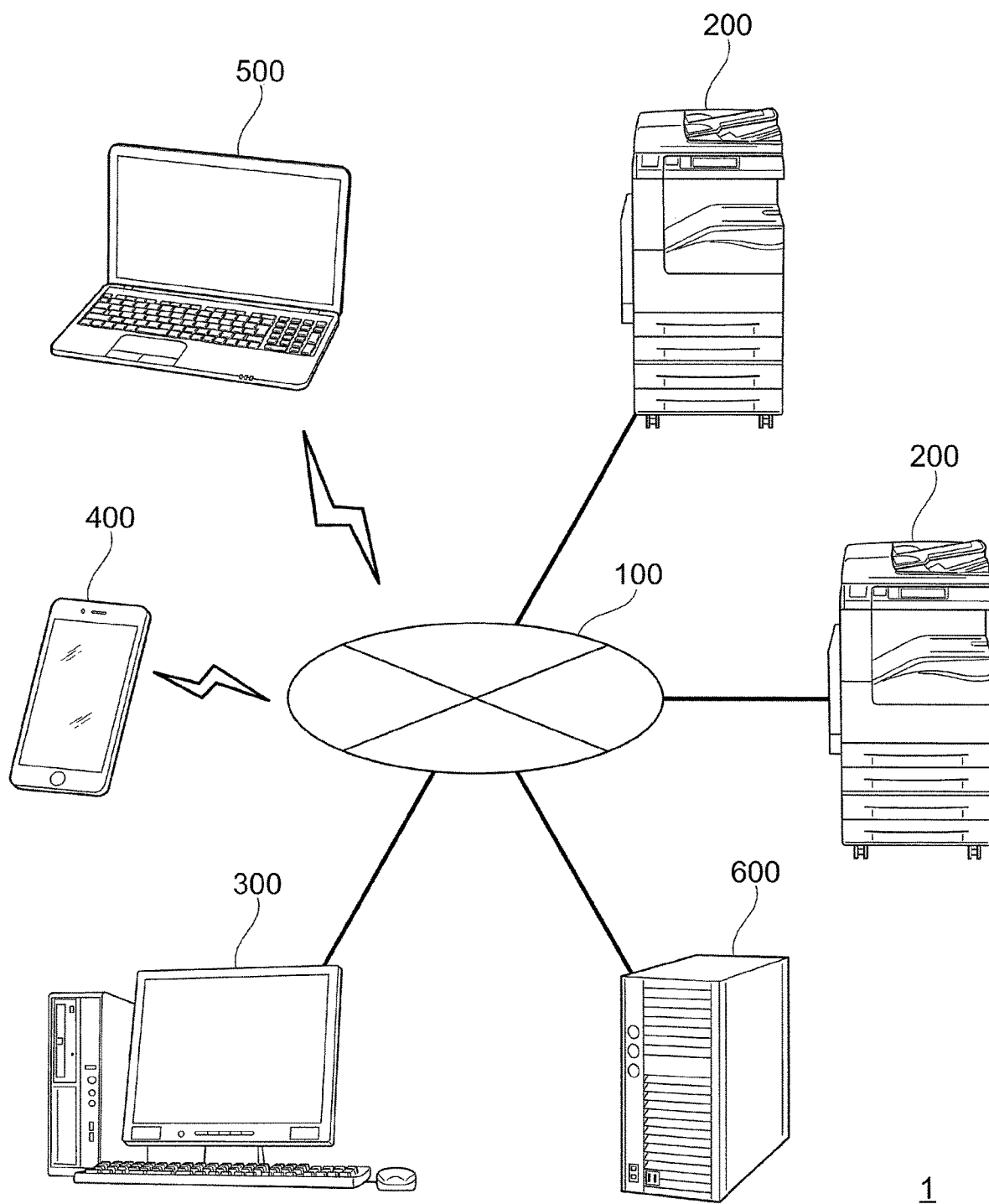
FIG. 1 illustrates a configuration example of an image forming system of an exemplary embodiment.

FIG. 1 illustrates a configuration example of an image forming system 1 of an exemplary embodiment.

The image forming system 1 includes image forming apparatuses 200 connected to a network 100, a stationary-type information terminal 300, a portable-type information terminal 400, a thin-client terminal 500, and a thin-client server 600.

Each of the stationary-type information terminal 300, the portable-type information terminal 400, the thin-client terminal 500, and the thin-client server 600 is an example of an information processing apparatus. These apparatuses are collectively referred to as a terminal apparatus.

Referring to FIG. 1, a smart phone is displayed as the portable-type information terminal 400. Alternatively, a note-book personal computer may be used for the portable-type information terminal 400.

Each of the terminal apparatus and the image forming apparatus 200 is an example of an electronic apparatus. The number of electronic apparatuses connected to the network 100 is illustrated for exemplary purposes only.

In accordance with the exemplary embodiment, the network 100 is a local-area network (LAN), but part thereof may be the Internet.

Each terminal apparatus may be connected to the network 100 wirelessly or wiredly. Referring to FIG. 1, the portable-type information terminal 400 and the thin-client terminal 500 are wirelessly connected to the network 100.

The image forming apparatus 200 forms an image on a recording medium, and has functionalities to copy, scan, facsimile transmit and receive, and to print. The image forming apparatus 200 may not necessarily have to have all the functionalities, but may be specialized to any particular functionality. For example, the image forming apparatus 200 may be a copying machine, a scanner, a facsimile machine, or a printer (including a three-dimensional printer).

Figure 2:
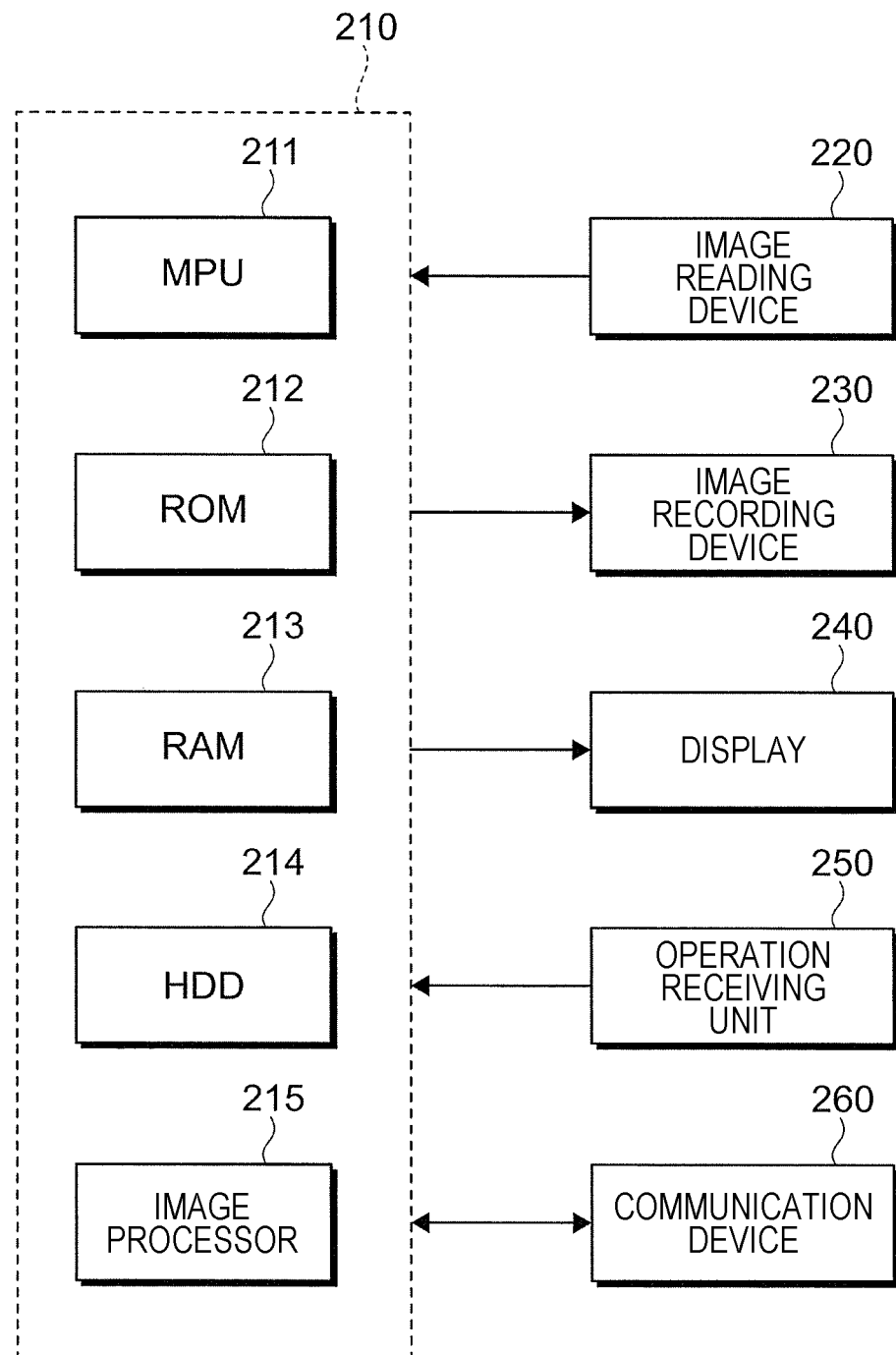
FIG. 2 illustrates a configuration of an image forming apparatus.

FIG. 2 illustrates a configuration of an image forming apparatus 200.

The image forming apparatus 200 includes a controller 210, an image reading device 220, an image recording device 230, a display 240, an operation receiving unit 250, and a communication device 260. The controller 210 controls the process of the whole image forming apparatus 200. The image reading device 220 reads an image on an original document. The image recording device 230 records an image a recording medium (hereinafter referred to as a "paper sheet"). The display 240 displays information that a user uses in operation. The operation receiving unit 250 receives an operation from the user. The communication device 260 is used to communicate with the network 100.

The image recording device 230 is an example of an image forming apparatus.

The controller 210 includes a micro processing unit (MPU) 211, a read-only memory (ROM) 212, a random-access memory (RAM) 213, a hard disk drive (HDD) 214, and an image processor 215. The MPU 211 executes an arithmetic process. The ROM 212 stores firmware. The RAM 213 is used as a working area. The HDD 214 is used to store image data. The image processor 215 performs image processing, including color correction and gradation correction, on image data.

The HDD 214 is an example of a memory.

Figure 3:
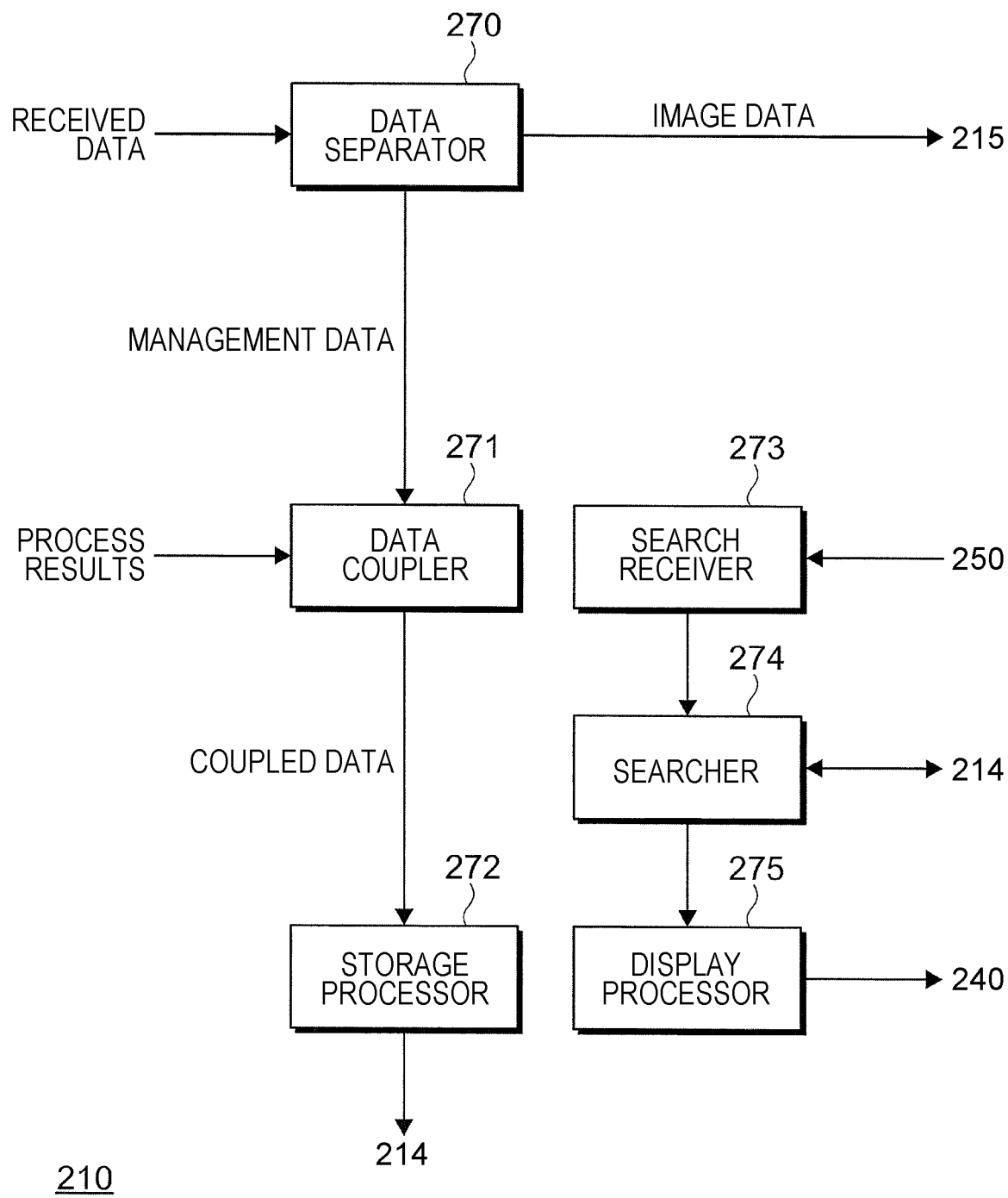
FIG. 3 illustrates a functional configuration of a controller included in the image forming apparatus.

FIG. 3 illustrates a functional configuration of the controller 210 included in the image forming apparatus 200.

The functionality of the controller 210 is performed when the controller 210 executes an application program.

The controller 210 includes a data separator 270, a data coupler 271, a storage processor 272, a search receiver 273, a searcher 274, and a display processor 275. The data separator 270 separates, from data received from the side of a terminal apparatus, image data and management data. The data coupler 271 couples the management data with information (process results) indicating image forming results. The storage processor 272 stores the coupled data onto the HDD 214. The search receiver 273 receives a search condition. The searcher 274 performs a search in accordance with the received search condition. The display processor 275 display search results on the display 240.

The data separator 270 is an example of a separating unit and the storage processor 272 is an example of a storing unit.

The management data of the exemplary embodiment includes information related to an operational environment of the terminal apparatus, and information that identifies the terminal apparatus. These pieces of information are collected in the terminal apparatus at a time point when print data is generated.

The time point when the print data is generated is an example of case "when a predetermined transmission condition is established subsequent to a start of an operation of the terminal apparatus".

The information related to the operational environment includes information concerning a software program running on the terminal apparatus, information concerning a driver, and setting information concerning a firewall.

The information concerning the software program (software information) includes a name of an operating system, a name of a software application in use, version information thereof, and batch information.

The information concerning the driver (driver information) includes version information of the driver, information concerning print setting (such as information concerning color printing or monochrome printing, magnification, simplex printing or duplex printing, page count assigned to one paper sheet, and orientation and type of paper sheet).

The information that identifies the terminal apparatus includes a name of a manufacturer of the terminal apparatus, a model name of the terminal apparatus, a host name, a user name, a user identifier, an Internet Protocol (IP) address, a media access control (MAC) address, and the like.

There are cases when the management data is received alone. In such a case, t e data separator 270 outputs the received management data as is to the data coupler 271.

The management data may be all or some of the variety of pieces of information described above.

The information indicating the image forming results (namely, process results) that are coupled with the management data by the data coupler 271 is information input by the user who has come to receive printed matter on the image forming apparatus 200, and includes an assessment as to whether an image is formed as the user has intended.

In accordance with the exemplary embodiment, a normal result (OK) or a fault result (not OK) is input as the process results.

For example, simplex printing may result in response to a command for duplex printing, or two pages are not assigned to a single paper sheet in response to a command for printing two pages on a single paper sheet. In such a case, the fault result (not OK) is input as the process results.

If an image that is verified on the terminal apparatus side is different from the printed image in terms of layout, color, and tone, a fault result (not OK) is input as the process result If an image is formed as the user has intended, a normal result (OK) is input as the process results.

If the management data is received alone, no process results are present. A data portion corresponding to the process results, of the coupled data output from the data coupler 271, is blank.

The search receiver 273 receives a search condition from the user who has instructed an image to be printed. For example, the user may input information that identifies the terminal apparatus operated by the user himself or herself.

The searcher 274 searches HDD 214 for a log that matches the input search condition. The searcher 274 may include, in a search target, a log of another terminal apparatus having a operational environment similar to that of the terminal apparatus specified as the search condition.

The display processor 275 performs a display process of the search results. Processes to be performed by the display processor 275 include a process to convert the search results into data in a format appropriate for the user tri verify on the display 240, a process to receive a narrowing condition that is applied when the number of search items is higher than a predetermined value, a process to extract and display a difference (or an update) between logs included in the search results, and a process to display contents of an item related to the difference (or the update) prior to updating and the contents of the item subsequent to the updating, in contrast to each other.

By extracting and then displaying the difference in a simple fashion or displaying the difference in a contrast fashion, a cause is easily identified even if the number of display items is large.

Figure 4:
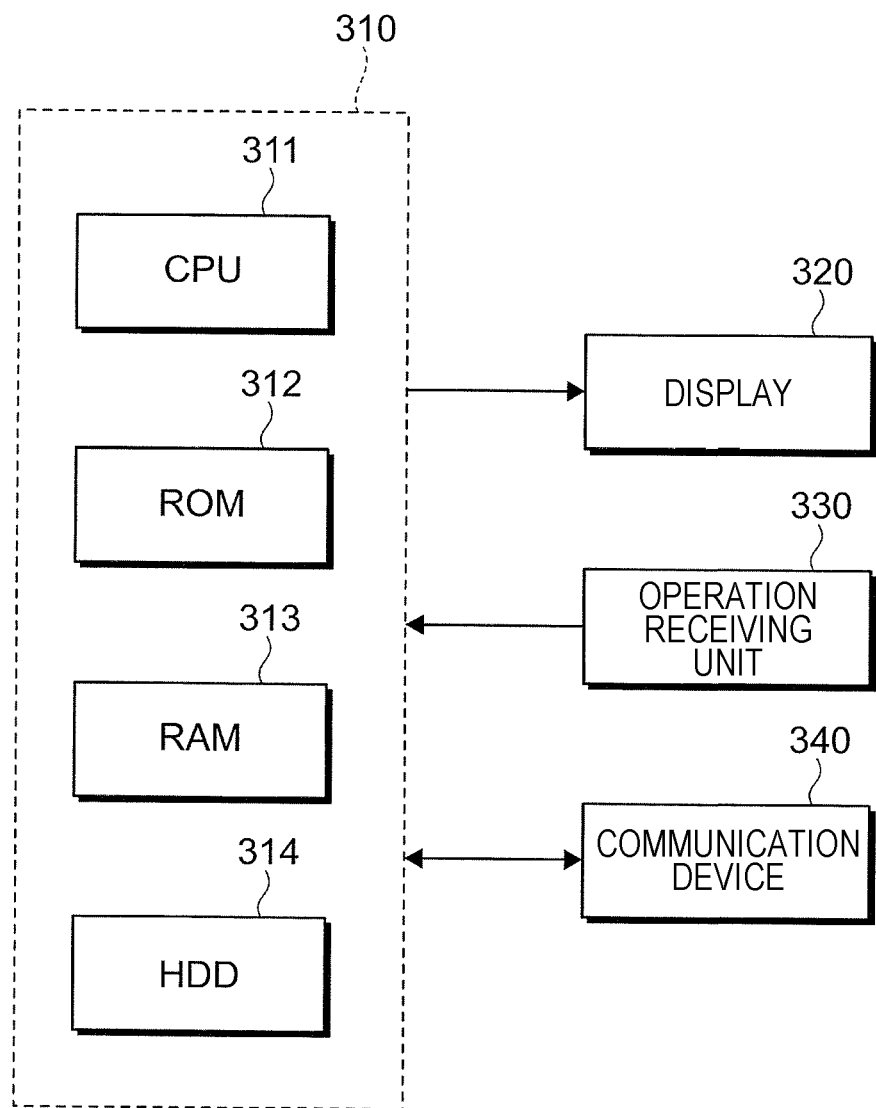
FIG. 4 illustrates a configuration of a stationary information terminal.

FIG. 4 illustrates a configuration of a stationary-type information terminal 300. A portable-type information terminal 400 is generally identical in configuration to the stationary-type information terminal 300.

The stationary-type information terminal 300 includes a controller 310, a display 320, an operation receiving unit 330, and a communication device 340. The controller 310 controls the operation of the whole t terminal 300. The display 320 displays information used by the user in operation. The operation receiving unit 330 receives an operation from the user. The communication device 340 is used to communicate with the network 100.

The controller 310 includes a central processing unit (CPU) 311 that performs an arithmetic operation, a read-only memory (ROM) 312 that stores a program like a startup program, a random-access memory (RAM) 313 that is used as a working area, and a hard disk drive (HDD) 314 that is used to store an operating system (OS), and image data used to form an image.

The portable-type information terminal 400 may employ a large-capacity semiconductor memory instead of the HDD 314.

Figure 5:
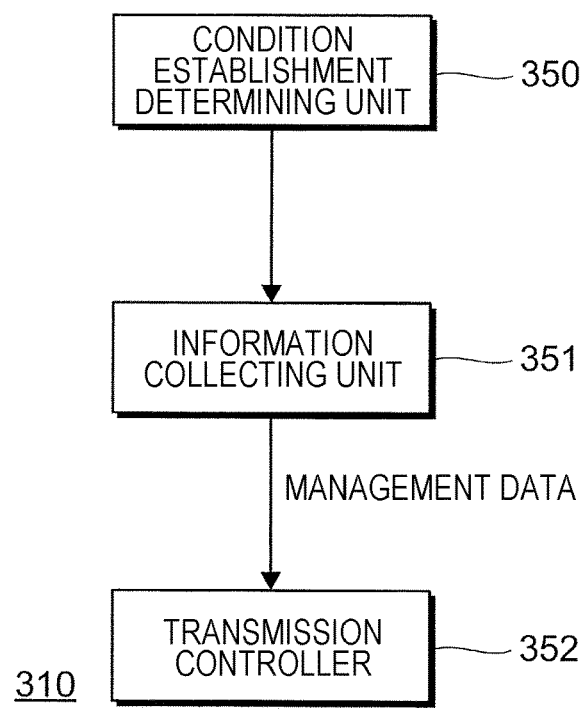
FIG. 5 illustrates a functional configuration of a controller included in the information terminal.

FIG. 5 illustrates a functional configuration of the controller 310 included in the information terminal 300.

The functionality of the controller 310 is implemented when the controller 310 executes an application program.

The controller 310 includes a condition establishment determining unit 350, an information collecting unit 351, and a transmission controller 352. The condition establishment determining unit 350 determines whether a predetermined transmission condition is satisfied (established) or not. The information collecting unit 351 collects the management data if the transmission condition is satisfied. The transmission controller 352 transmits the collected management data to the image forming apparatus 200.

The controller 310 (specifically, the condition establishment determining unit 350 and the information collecting unit 351) is an example of the collecting unit, and the communication device 340 (specifically, the transmission controller 352) is an example of the transmitting unit.

Figure 6:
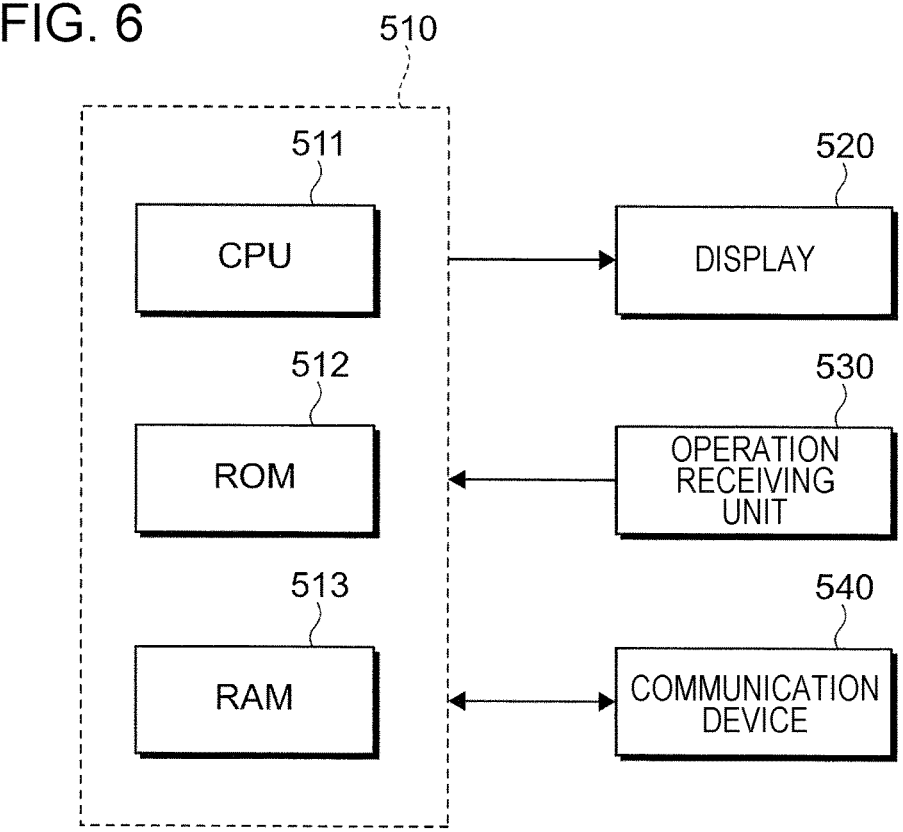
FIG. 6 illustrates a configuration of a thin-client terminal.

FIG. 6 illustrates a configuration of a thin-client terminal 500.

The thin-client terminal 500 includes a controller 510, a display 520, an operation receiving unit 530, and a communication device 540. The controller 510 controls the operation of the whole thin-client terminal 500. The display 520 displays information that the user uses to operate the thin-client terminal 500. The operation receiving unit 530 receives an operation from the user. The communication device 540 is used to communicate with the network 100.

The controller 510 is an example of the collecting unit, and the communication device 540 is an example of the transmitting unit.

The controller 510 includes a CPU 511 that executes an arithmetic operation, a ROM 512 that stores a program, such as a startup program, and a RAM 513 that is used as a working area.

The throughput of the CPU 511 is typically lower than the counterparts in the stationary-type information terminal 300 and the portable-type information terminal 400, and the memory capacity of the RAM 513 is lower than the memory capacity of the counterparts in the stationary-type information terminal 300 and the portable-type information terminal 400.

The thin-client terminal 500 of the exemplary embodiment may be of a screen transfer type that downloads a screen from the thin-client server 600 and presents the screen on the display 520, or a network boot type that downloads an operating system from the thin-client server 600 to a desktop image, and then executes the operating system.

Figure 7:
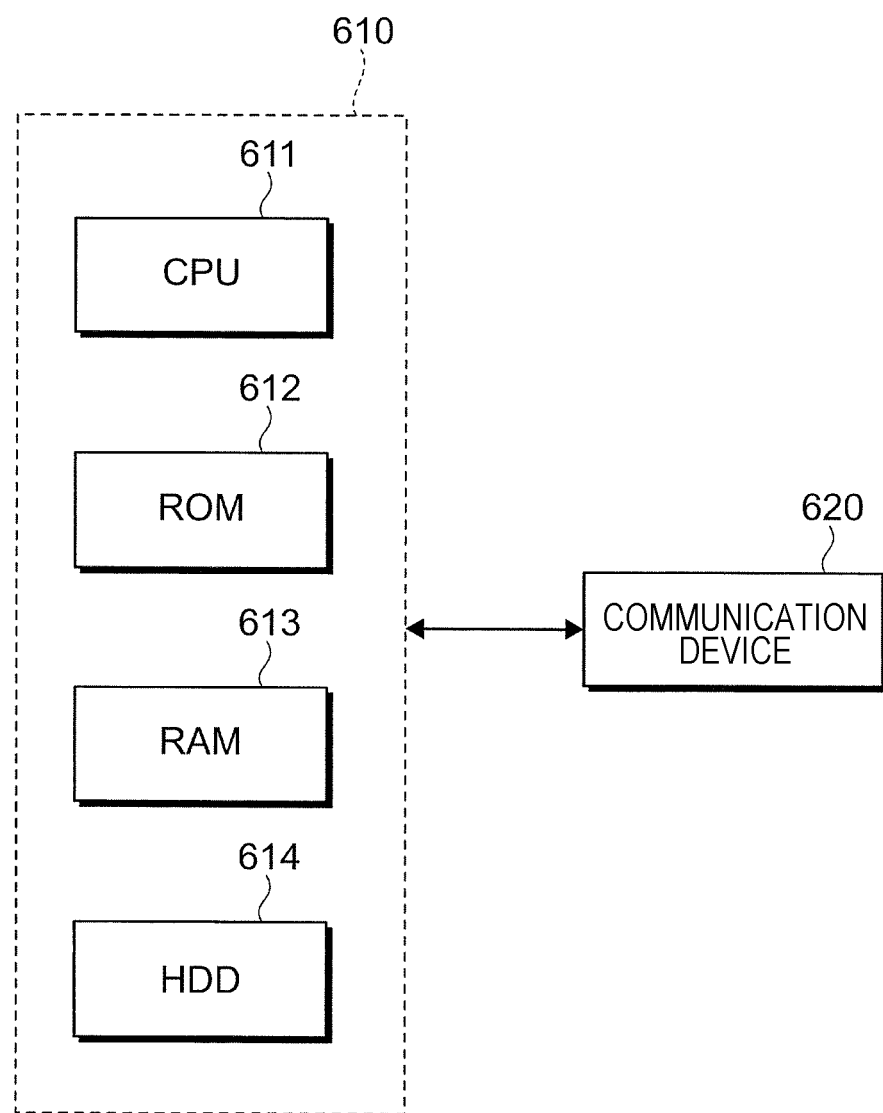
FIG. 7 illustrates a configuration of a thin-client server.

FIG. 7 illustrates a configuration of the thin-client server 600.

The thin-client server 600 includes a controller 610 that generally controls the whole thin-client server 600, and a communication device 620 that is used to communicate with the network 100.

The controller 610 is an example of the collecting unit, and the communication device 6211 is an example of the transmitting unit.

The controller 610 includes a CPU 611 that performs an arithmetic process, a ROM 612 that stores a program, such as a startup program, a RAM 613 that is used as a working area, and an HDD 614 that stores a variety of software applications, and data.

The thin-client server 600 of the exemplary embodiment is different in terms of configuration and process depending on whether the system is the screen transfer type or the network boot type.

In accordance with the exemplary embodiment, a driver for the image forming apparatus 200 is installed on the stationary-type information terminal 300 and the portable-type information terminal 400. Through the driver, each the stationary-type information terminal 300 and the portable-type information terminal 400 controls the operation of the image forming apparatus 200.

Upon receiving an operation to instruct an image to be printed, the stationary-type information terminal 300 or the portable-type information terminal 400 generates print data through the driver therewithin, transmits the print data to the image forming apparatus 200, and causes the image forming apparatus 200 to print the image on a recording medium.

The image forming apparatus 200 transmits image data generated through scanning the image to the stationary-type information terminal 300 or the portable-type information terminal 400 via the network 100.

Upon receiving an operation to instruct an image to be printed, the thin-client terminal 500 generates print data via the driver on the thin-client server 600, transmits the print data to the image forming apparatus 200, and causes the image forming apparatus 200 to print the image on a recording medium.

The thin-client system including the thin-client terminal 500 and the thin-client server 600 is an example of a client server system that includes a client terminal and a server. The client server system controls the image forming apparatus 200 in operation via a driver that is dependent on a device structure of a server (not illustrated).

In the client server system, however, print settings received from a client terminal (such as duplex printing, setting in which plural pages are assigned on a paper sheet, and paper sheet size) may not necessarily be correctly reflected on the driver in the server. In such a case, print results are not obtained as the user operating the client terminal has intended.

The operational environment in each terminal apparatus of the image forming system 1 may have changed since the driver of the image forming apparatus 200 was installed. This is because the operating system may be upgraded in version, or the driver may be updated.

If a terminal apparatus is shared by multiple persons, information related to each user who has operated the terminal apparatus may not necessarily be stored on the terminal apparatus for security reasons.

In such a case, the operational environment is difficult to obtain from the image forming apparatus 200 at the time point of the occurrence of a print fault, and the user who has instructed printing to be performed has difficulty in identifying the cause for the fault.

Each of the terminal apparatuses of the exemplary embodiment (other than the thin-client terminal 500) is thus provided with a functionality that collects information concerning the operational environment of the terminal apparatus and transmits the collected information to the image forming apparatus 200 at a time when the predetermined transmission condition has been established.

Figure 8:
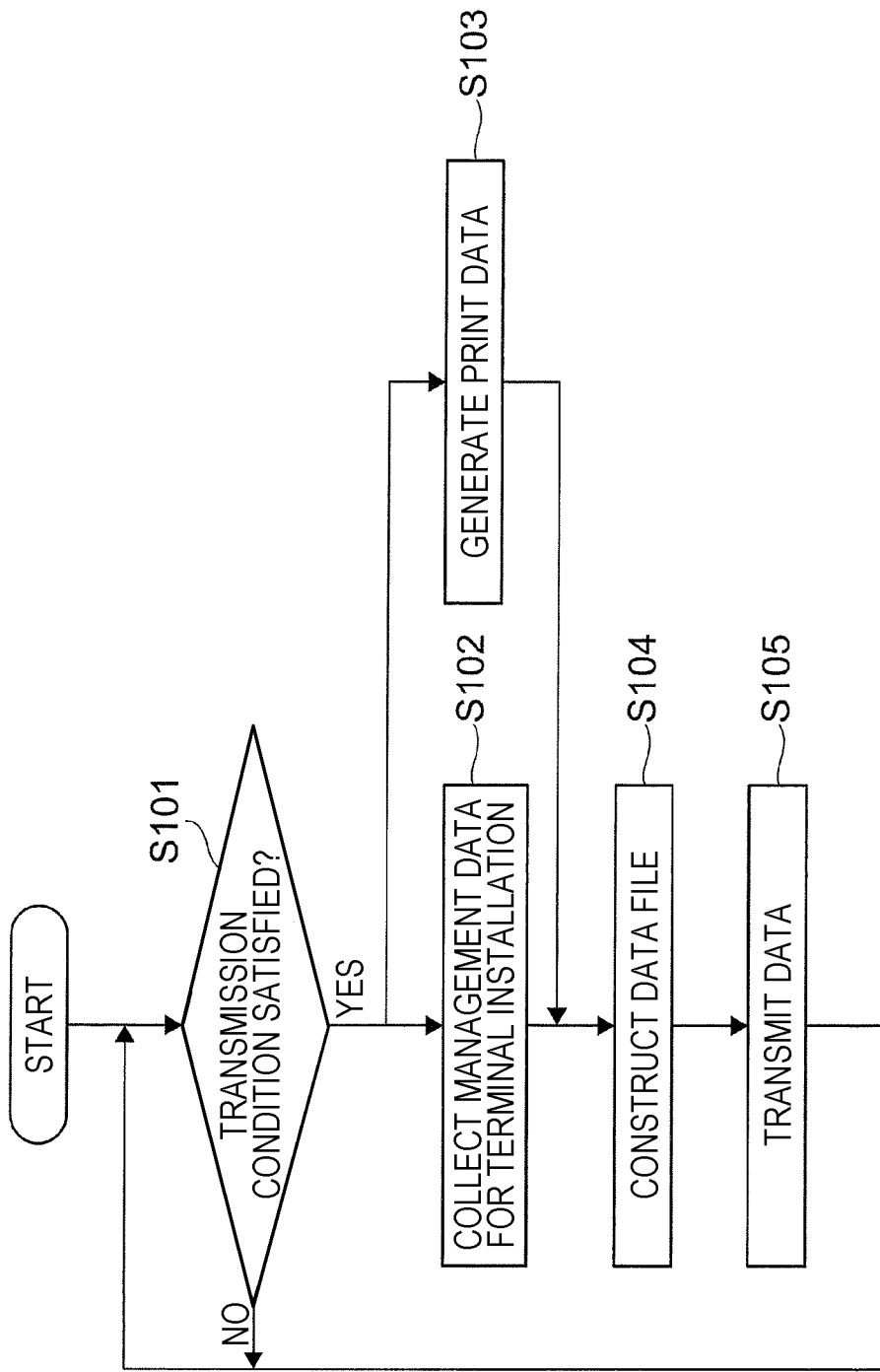
FIG. 8 is a flowchart illustrating a process of a terminal apparatus of the exemplary embodiment.

FIG. 8 is a flowchart illustrating a process of the terminal apparatus of the exemplary embodiment.

The process of FIG. 8 is performed when the CPU 311 (see FIG. 4), the CPU 511 (see FIG. 6), and the CPU 611 (see FIG. 7) perform the programs (including drivers) thereof in the terminal apparatuses. Each of the CPU 311, the CPU 511, and the CPU 611 is hereinafter referred to as a "CPU of the terminal apparatus".

From the beginning of the use of the terminal apparatus, the CPU of the terminal apparatus determines whether the predetermined transmission condition has been satisfied (step S101).

The phrase "from the beginning of the use of the terminal apparatus" is intended to mean that the image forming apparatus 200 is ready to be used by the terminal apparatus after the installation of the driver of the image forming apparatus 200 on the terminal apparatus is complete.

A typical case that satisfies the transmission condition is that a command to print has been received from the user. Other cases that satisfy the transmission condition includes a case that the user has instructed the management data of the terminal apparatus to be transmitted, a case that a power-on operation has been received, and a case that a predetermined time point has come. Each of those cases is an example in which the predetermined transmission condition has been established.

If the transmission condition is satisfied (the determination in step S101 branches to yes branch), the CPU of the terminal apparatus collects the management data within the terminal apparatus at that time point (when the transmission condition is satisfied) (step S102), and generates the print data as appropriate (step S103).

Note that there may be a time difference permitted between the time point when the transmission condition is satisfied and the time point when the management data is collected. The time difference may be several seconds.

If the command to print has been received, operations in steps S102 and S103 are performed. If the transmission condition excluding the command to print is satisfied, the operation in step S102 is performed alone.

The management data includes information related to the operational environment of the terminal apparatus and information that identifies the terminal apparatus.

The CPU of the terminal apparatus constructs a data file from the collected management data and print data (step S104), and transmits the data file as transmission data to the image forming apparatus 200 (step S105). If no print data is present, the management data alone is organized into the data file.

Figure 9:
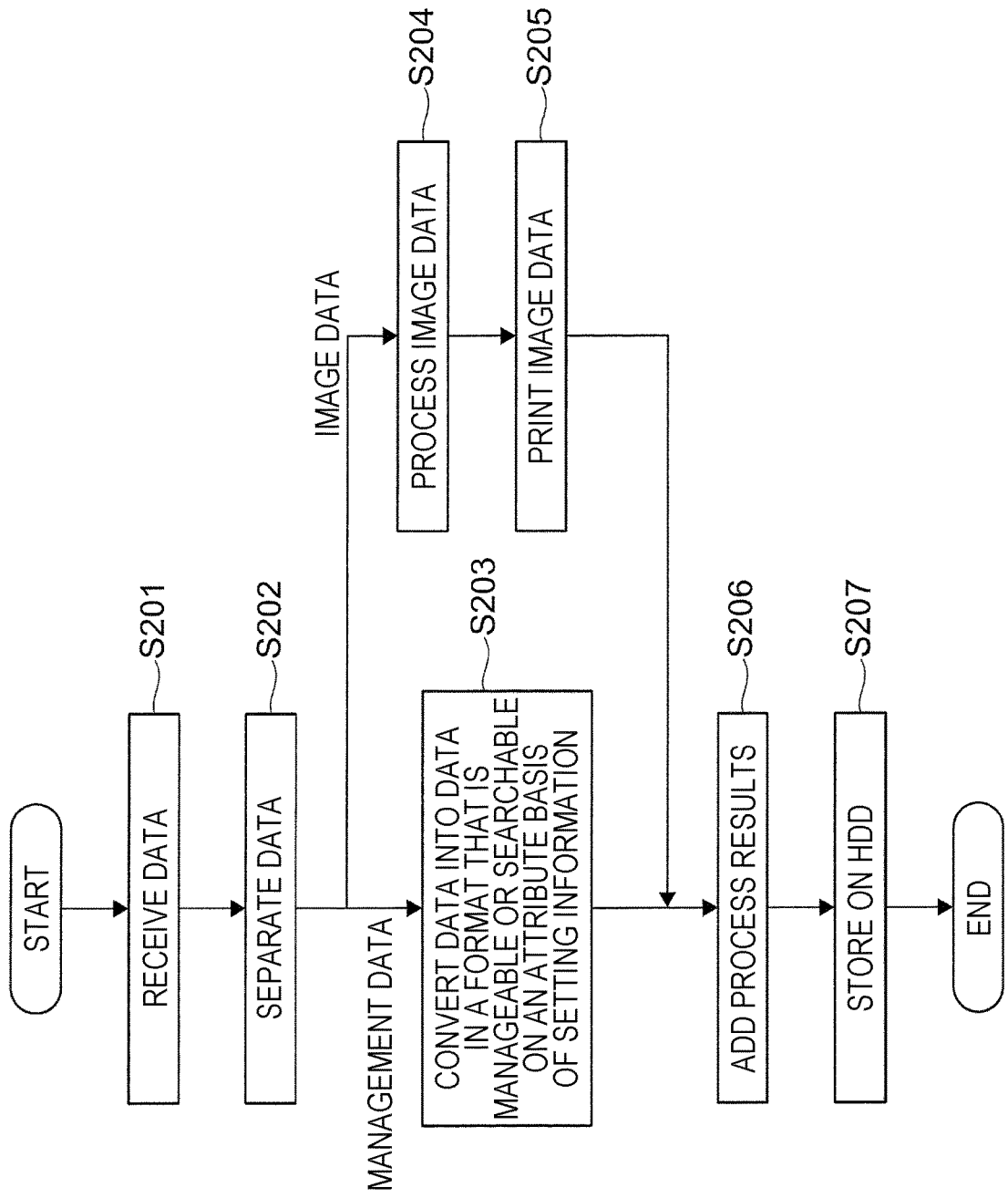
FIG. 9 is a flowchart illustrating a process of the image forming apparatus of the exemplary embodiment when the image forming apparatus has received data from the terminal apparatus.

FIG. 9 is a flowchart illustrating a process of the image forming apparatus 200 (see FIG. 2) of the exemplary embodiment when the image forming apparatus 200 has received data from the terminal apparatus.

The process of FIG. 9 is implemented when the MPU 211 (see FIG. 2) in the image forming apparatus 200 performs the corresponding program.

Upon receiving the date from the terminal apparatus (step S201), the MPU 211 in the image forming apparatus 200 separate the management data and image data from the received data (step S202). As described below, the image data may not necessarily be included.

Subsequent to the data separation, the MPU 211 in the image forming apparatus 200 converts the management data into data in a format that is manageable and searchable, according to an attribute of setting information (step S203).

The attribute of the setting information refers to an attribute included in the management data, and may be information identifying the terminal apparatus, information concerning software, information concerning a driver, and setting information concerning a firewall.

In accordance with the exemplary embodiment, the format that is manageable and searchable may be comma-separated values (CSV), and xls (an example of an extension of Excel (registered trademark)).

The MPU 211 in the image forming apparatus 200 performs image processing, including color correction or gradation correction, on the image data (step S204), and then performs printing of the image data (step S205).

If the data transmitted from the terminal apparatus includes the image data (includes a print command), the user who approaches the image forming apparatus 200 to receive the user's own printed matter enters to the image forming apparatus 200 an assessment, as process results, concerning whether the print results are obtained as the user has intended. The print command is an example of an image forming command.

When the MPU 211 in the image forming apparatus 200 receives the process results input by the user, the MPU 211 in the image forming apparatus 200 adds the process results to the converted data (step S206). If there is no fault, the MPU 211 in the image forming apparatus 200 adds a normal result (OK). If there is a fault, the MPU 211 in the image forming apparatus 200 adds a fault result (not OK).

An example of the process results may be the user's assessment as to whether a fault has occurred in the image forming.

The faults related to the image forming include unsuccessful printing (due to unsuccessful communications, running out of paper sheet or toner), and an assessment of image quality.

Faults related to the image quality include a difference between a color tone intended by the user and a color tone appearing in the print results, a difference between a layout intended by the user and a layout appearing in the print results, a difference between a size expansion or a size reduction intended by the user and a size expansion or a size reduction appearing in the print results, and a different between a font intended by the user and a font appearing in the print results.

The operation receiving unit 250 (see FIG. 2) is used to input those pieces of information.

If the data transmitted from the terminal apparatus does not include the image data, the process results are not entered, leaving a corresponding column empty.

The MPU 211 in the image forming apparatus 200 stores the process results together with the converted data on the HDD 214 (step S207).

When the conversion process of the management data is complete, the converted data may be stored on the HDD 214. When the process results input by the user are received, the process results may be added in association with the corresponding data.

If the storage period, the number of storage items, and the storage size of the management data exceed predetermined criteria thereof on the HDD 214, data may be deleted on a first-in first-out basis (using an overwrite deletion or any other method).

If a user detects a fault in the print results, the user may identify the cause for the fault. The user may search for the management data of the terminal apparatus operated by the user, and cause the display 240 (see FIG. 2) to display the management data. The process performed by the image forming apparatus 200 (see FIG. 2) in this case is described below.

Figure 10:
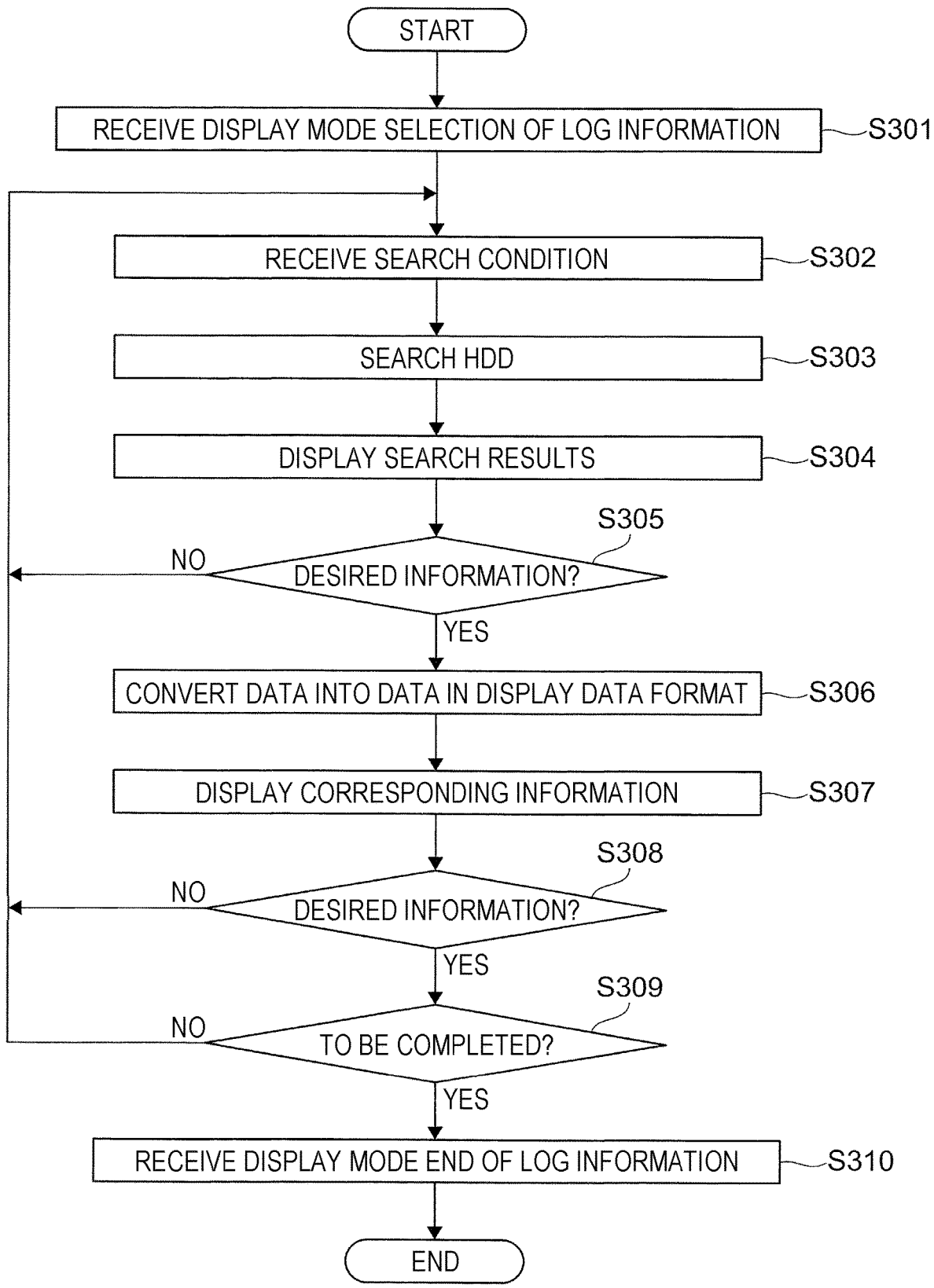
FIG. 10 is a flowchart illustrating a process of the image forming apparatus of the exemplary embodiment which is performed to display management data corresponding to a search condition when a user inputs the search condition to the image forming apparatus.

FIG. 10 is a flowchart illustrating a process of the image forming apparatus 200 which is performed to display the management data corresponding to a search condition when a user inputs the search condition to the image forming apparatus 200 of the exemplary embodiment.

The MPU 211 in the image forming apparatus 200 (see FIG. 2) receives a display mode of log information selected by the user (step S301). The user selects the display mode of the management data via the operation receiving unit 250 (see FIG. 2). The selection of the display mode is typically performed when the user detects a fault in the print results.

The selection of the display mode is an example that is performed when a command to perform a search is issued.

Via the operation receiving unit 250, the MPU 211 in the image forming apparatus 200 receives the search condition specified by the user (step S302). For example, the user inputs, as the search condition, information (such as a host name, user ID, user name, IP address, and/or MAC address) that identifies a terminal apparatus serving as a search target (namely, the terminal apparatus operated by the user).

For example, if the MAC address is input, the target terminal apparatus is uniquely identified even if plural terminal apparatuses are operated by the user.

If the hos name is input as the search condition, or if there are plural terminal apparatuses associated with the user ID, the MPU 211 in the image forming apparatus 200 displays on the display 240 (see FIG. 2) plural terminal apparatuses that may be candidates, prompting the user to select one therefrom. When the user selects a terminal apparatus, processing proceeds to step S303.

The MPU 211 in the image forming apparatus 200 having received the search condition searches the HDD 214 according to the received search condition serving as a search key (step S303), and displays on the display 240 the presence or absence and the number of pieces of log information of the identified terminal apparatus (step S304).

The MPU 211 in the image forming apparatus 200 receives an operational input as to whether search results are information desired by the user, and thus determines whether the operational input indicates the information desired by the user (step S305).

If the determination in step S305 branches to no branch, to MPU 211 in the image forming apparatus 200 returns to step S302 to receive a new search condition. If the determination in step S305 branches to yes branch, the MPU 211 in the image forming apparatus 200 proceeds to step S306.

In step S306, the MPU 211 in the image forming apparatus 200 converts the process results responsive to the log of the management data identified by the user into data in a format for displaying.

The MPU 211 in the image forming apparatus 200 displays the corresponding information on the display 240 (step S307). If there is any command from the user, the MPU 211 in the image forming apparatus 200 may print the corresponding information on a paper sheet first.

FIG. 11 illustrates a display screen example of search results.

As previously described, the search results are displayed on the display 240.

Information concerning the process results responsive to a log of management data of three rounds received by the image forming apparatus 200 is displayed on a display screen 700 of FIG. 11 round by round.

The information concerning the process results responsive to the log of the management data at each round includes rows for time and date 711, host name 712, user ID 713, operating system (OS) 715, driver version 716, port setting 717, IP address 718, MAC address 719, file name 720, process results 721, page count 722, print setting 723, and the like.

If an amount of the information is large, the MPU 211 in the image forming apparatus 200 desirably extracts information updated (updated points) between rounds, from the information of the process results responsive to the log of the management data at the rounds.

Referring to FIG. 11, items for driver version 716 and process results 721 are updated, and only information of the items may be extracted and displayed.

The cause for a fault is easily verified by displaying in this way. Contents prior to updating and contents subsequent to the updating are desirably displayed in contrast.

Turning back to FIG. 10, the MPU 211 in the image forming apparatus 200 receives an operational input as to whether search results are information desired by the user, and thus determines whether the operational input indicates the information desired by the user (step S308).

If the determination in step S308 branches to no branch, the MPU 211 in the image forming apparatus 200 returns to step S302 to receive a new search condition. If the determination in step S308 branches to yes branch, the MPU 211 in the image forming apparatus 200 proceeds to step S309.

In step S309, the MPU 211 in the image forming apparatus 200 determines whether the user who has verified the updated point has issued a command to end the process (step S309).

If the determination in step S309 branches to no branch, the MPU 211 in the image forming apparatus 200 returns to step S302 to receive a new search condition. If the determination in step S309 branches to yes branch, the MPU 211 in the image forming apparatus 200 proceeds to step S310 and accepts an end of a display mode of the log information (step S310).

In the display mode of the log information, the user may easily identify the cause for the fault from a difference between the contents of the log of the management data from which normal process results (OK) are obtained and the contents of the log of the management data from which fault process results (not OK) are obtained. In other words, the user may be able to verify contents to be corrected to obtain print results intended by the user.

If the user corrects the setting of the corresponding item in the terminal apparatus, the image forming apparatus 200 reverts back to a state in which desired process results are obtained at the next printing.

In accordance with the exemplary embodiment, the information related to the operational environment of the terminal apparatus is transmitted to the image forming apparatus 200 for storage there not only when the driver is installed, but also when the terminal apparatus is ready for use. The information related to the operational environment of the terminal apparatus with a fault occurring in the print results is identified on the image forming apparatus 200. The user may easily identify the cause for the fault.

In accordance with the exemplary embodiment, the information related to the operational environment of the terminal apparatus may not be stored on the terminal apparatus side. For example, data storage may be limited for privacy protection when the terminal apparatus is shared by multiple persons or data storage may be difficult on a terminal apparatus like the thin-client terminal 500. In accordance with the exemplary embodiment, the information related to the operational environment of the terminal apparatus with a fault occurring in the print results is identified on the image forming apparatus 200. The user may easily identify the cause for the fault.

In accordance with the exemplary embodiment, the thin-client system includes the thin-client terminal 500 and the thin-client server 600. The thin-client system may be a computer that has reinforced authentication for security.

As described previously, the thin-client system may be a client server system.

In accordance with the exemplary embodiment, the process results corresponding to the log of the stored management data concerning the terminal apparatus operated by the user is displayed as the search results. Also, the search results may include process results and a log of stored management data concerning another terminal apparatus having an operational environment similar to the operational environment of the terminal apparatus operated by the user.

A terminal apparatus having a larger number of items matching the operational environment of a particular terminal apparatus may be selected as the other terminal apparatus having the operational environment similar to the operational environment of the terminal apparatus operated by the user. Alternatively, a terminal apparatus having the number of matched items equal to or above a predetermined value may be selected as the other terminal apparatus.

With that functionality, the possibility of identifying the cause for the fault is increased.

In an actual operational environment, the management data related to the terminal apparatus of the user may not be stored on the image forming apparatus 200.

In accordance with the exemplary embodiment, the user may input, as the search condition, information concerning the operational environment of the terminal apparatus operated by the user, including information related to the terminal apparatus, such as a manufacturer's name, and a model name, information concerning an operating system, and interface information. The user may thus be able to obtain as the search results the process results corresponding to the management data of the terminal apparatus having the operational environment similar to the operational environment of the terminal apparatus operated by the user.

The user may enter settings to the terminal apparatus operated by the user by referencing the search results, thereby obtaining the print results free from any fault.

In accordance with the exemplary embodiment, all the management data transmitted from the terminal apparatus is received by the image forming apparatus 200. In an actual operation, however, some of the data may not reach the image forming apparatus 200.

If printed matter is not output on the image forming apparatus 200, the user may be going to determine whether the cause for the no-output fault lies in the image forming apparatus 200.

The user switches the operation mode of the image forming apparatus 200 to a display mode, and identifies a terminal apparatus operated by the user, by entering the search condition.

The user then determines whether a reception log related to a current print command (namely, an image forming command) is present in the log of the stored management data concerning the identified terminal apparatus.

If the reception log is found, the cause for the no-output fault lies in the image forming apparatus 200. If the reception log is not found, the cause for the no-output fault lies in the terminal apparatus operated by the user or the network 100.

To identify the cause, the user transmits a communication acknowledgement command (such as a ping command) to the identified terminal apparatus. The image forming apparatus 200 displays on the display 240 the presence or absence of a reply to the communication acknowledgement command as an acknowledgement result. By checking the acknowledgement result, the user may learn whether the fault lies in the network 100.

In accordance with the exemplary embodiment, the search results are output to the display 240 in the image forming apparatus 200. In a communication-enabled state with the terminal apparatus, however, the search results may be transmitted to the terminal apparatus as a data file.

In such a case, the user may modify the setting on the terminal apparatus operated by himself or herself by checking the search results displayed on the display 320 (see FIG. 4) or the display 520 (see FIG. 6).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
a collecting unit that, when a predetermined transmission condition is established after a start of an operation of the information processing apparatus, collects information related to an operational environment of the information processing apparatus; and
a transmitting unit that transmits the collected information to an image forming apparatus connected to the information processing apparatus via a network,
wherein the predetermined transmission condition is established when an image forming command is received by the image forming apparatus, and the information processing apparatus collects the environmental information when the image forming command is received by the image forming apparatus.

2. The information processing apparatus according to claim 1, wherein the image forming command is to form an image on a recording medium.

3. The information processing apparatus according to claim 1, where the information related to the operational environment comprises one or more pieces of information selected from software information used in the information processing apparatus, version information of a driver of the image forming apparatus, and setting information of a firewall.

4. The information processing apparatus according to claim 3, wherein the software information comprises one or more pieces of information selected from an operating system and version information of the operating system, an installed application program and version information of the installed application program, and batch information.

5. The information processing apparatus according to claim 3, wherein the information related to the operational environment further comprises information that identifies the information processing apparatus, and wherein the information that identifies the information processing apparatus includes one or more pieces of information selected from a name of a manufacturer, a model name, a host name, a user name, and a user identifier.

6. A non-transitory computer readable medium storing a program causing a computer to execute a process for processing information, the process comprising:
with a predetermined transmission condition established after a start of an operation of the computer, collecting information related to an operational environment of the computer; and
transmitting the collected information to an image forming apparatus connected to the computer via a network
wherein the predetermined transmission condition is established when an image forming command is received by the image forming apparatus, and the computer collects the environmental information when the image forming command is received by the image forming apparatus.

* * * * *